Patented Dec. 28, 1937

2,103,272

UNITED STATES PATENT OFFICE 2,103,272

PROCESS FOR THE PRODUCTION OF β-METHYLCHOLINE ETHERS AND SALTS THEREOF

Georg Roeder, Rahway, N. J., assignor to Merck & Co. Inc., Rahway, N. J., a corporation of New Jersey No Drawing. Application January 30, 1937, Serial No. 123,151

3 Claims. (Cl. 260—25)

This invention relates to processes for the production of β-methylcholine ethers and their salts.

In U. S. Patent No. 2,049,463, issued August 4, 1936, there is described a process for preparing β-alkylated choline alkyl ether salts by reacting upon the corresponding alpha-alkyl-beta-bromomethyl alkyl ether with a solution of trimethylamine in benzene.

However, this process is rather involved and has the disadvantage that the bromides are always produced as primary products, and if other salts are desired, they must be produced from the bromides.

I have now found a process for preparing ethers of β-methylcholine and their salts, which is free of the disadvantages of the known process, and by which the desired products may be obtained directly and in good yield.

The starting material in my new process is 1-dimethylamino-2-hydroxy propane which may be easily prepared from propylenoxide and dimethylamine. I have found that 1-dimethylamino-2-hydroxypropane forms alkali salts such as sodium, lithium, and potassium salts, for example, which are readily soluble in hydrocarbons of the type of benzol. When such a solution of an alkali salt of 1-dimethylamino-2-hydroxypropane is treated with an appropriate alkylating agent, an excellent yield of the corresponding ether is obtained, which in its turn may be treated with appropriate alkylating agents to give the desired salt of the β-methylcholine alkyl ether.

The process of my invention is described in detail in the following examples, where it is applied to the production of β-methylcholine ethyl ether bromide and β-methylcholine ethyl ether chloride. However, these examples are illustrative, only, and it is to be understood that certain modifications may be made therein, without departing from the spirit of my invention, and the scope of the appended claims.

Examples (1) About 103 gms. of 1-dimethylamino-2-hydroxypropane are dissolved in benzol and about 40 gms. of finely powdered sodamide are added. Ammonia starts to form at once and the reaction is completed by refluxing on a steam bath until nearly all of the sodamide is dissolved. The ammonia is completely removed either by connecting the top of the condenser with a vacuum, or by distilling off part of the solvent and replacing it by fresh benzol. The solution is cooled with ice. About 1 mol. of diethylsulfate is added gradually. The mixture heats spontaneously and gelatinous sodium ethyl sulfate separates. The mixture is refluxed for several hours on a steam bath and, after cooling, is extracted first with water and then with dilute mineral acid. The acid solution is neutralized and 1-dimethylamino-2-ethoxypropane is salted out with potassium hydroxide.

The oily layer is dried with potassium hydroxide, and then with barium oxide, and is distilled. The yield is 70 to 80% of theory.

The yield is increased when the alkaline solution from which the base has been salted out, as well as the solids used for drying the base, are extracted with ether, the ethereal extract shaken with acid, and the acid solution again salted out with potassium hydroxide.

The 1-dimethylamino-2-ethoxypropane is dissolved in benzol, methylbromide is added, and β-methylcholine ethyl ether bromide separates with cooling. It is allowed to stand for about 10 hours, and is then filtered. The product occurs in the form of white hygroscopic crystals melting at 130°–132° C.

(2) About 103 gms. of 1-dimethylamino-2-hydroxypropane are dissolved in benzol, and about 40 gms. of finely powdered sodamide are added. Ammonia starts to form at once and the reaction is completed by refluxing on a steam bath until nearly all of the sodamide is dissolved. The ammonia is completely removed either by connecting the top of the condenser with a vacuum, or by distilling off part of the solvent and replacing it by fresh benzol. The solution is cooled with ice. About 1 mol. of diethylsulfate is added gradually. The mixture heats spontaneously and gelatinous sodium ethyl sulfate separates. The mixture is refluxed for several hours on a steam bath and, after cooling, is extracted first with water and then with dilute mineral acid. The acid solution is neutralized and 1-dimethylamino-2-ethoxypropane is salted out with potassium hydroxide. The oily layer is dried with potassium hydroxide, and then with barium oxide, and is distilled. The yield is about 80% of theory.

The yield is increased by further working up of the mother liquors, in accordance with Example 1.

The 1-dimethylamino-2-ethoxypropane is dissolved in benzol, placed in an autoclave, and left standing for about 10 hours under the pressure of a cylinder containing compressed methylchloride. The β-methylcholine ethyl ether chloride thus formed is filtered and purified. It occurs in the form of white hygroscopic crystals melting at about 132–134° C.

I claim as my invention:

1. A process for the production of salts of methylcholine ethers which comprises reacting an alkali metal salt of 1-dimethylamino-2-hydroxy-propane with an alkylating agent to form the corresponding 1-dimethylamino-2-alkoxy propane, and then reacting upon this ether with an alkylating agent of the group consisting of alkyl halides and sulfate, to form the corresponding alkyl salt of dimethyl-amino-2-alkoxy-propane.

2. A process for the production of the bromide of β-methylcholine ethyl ether which comprises reacting the sodium salt of 1-dimethylamino-2-hydroxy propane with diethylsulfate to form the corresponding ethyl ether, 1-dimethylamino-2-ethoxy-propane, and then reacting upon the ether with methyl bromide to form β-methyl-choline-bromide-ethyl ether.

3. A process for the production of the chloride of β-methylcholine ethyl ether which comprises reacting the sodium salt of 1-dimethylamino-2-hydroxypropane with diethylsulfate to form the corresponding ethyl ether, 1-dimethylamino-2-ethoxypropane, and then reacting upon the ether with methylchloride to form β-methyl-choline-chloride-ethyl ether.

GEORG ROEDER.